US008856253B2

(12) United States Patent
Ku et al.

(10) Patent No.: US 8,856,253 B2
(45) Date of Patent: Oct. 7, 2014

(54) METHOD AND SYSTEM FOR PRESENTING REPOSTED MESSAGE

(75) Inventors: Yu Ku, Shenzhen (CN); Ning Lao, Shenzhen (CN); Hongjie Liu, Shenzhen (CN); Changwen Yuan, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 39 days.

(21) Appl. No.: 13/639,176

(22) PCT Filed: Jul. 12, 2011

(86) PCT No.: PCT/CN2011/077061
§ 371 (c)(1),
(2), (4) Date: Oct. 3, 2012

(87) PCT Pub. No.: WO2012/024987
PCT Pub. Date: Mar. 1, 2012

(65) Prior Publication Data
US 2013/0060877 A1    Mar. 7, 2013

(30) Foreign Application Priority Data

Aug. 24, 2010   (CN) .......................... 2010 1 0266925

(51) Int. Cl.
*G06F 15/16*     (2006.01)
*G06Q 10/10*     (2012.01)
*H04L 12/58*     (2006.01)

(52) U.S. Cl.
CPC .............. *G06F 15/16* (2013.01); *G06Q 10/107* (2013.01); *H04L 12/585* (2013.01); *H04L 12/58* (2013.01); *H04L 12/581* (2013.01); *H04L 12/5855* (2013.01)
USPC ........................................................ 709/206

(58) Field of Classification Search
CPC .... G06F 15/16; G06Q 10/107; H04L 12/585; H04L 12/58; H04L 12/581; H04L 12/5855
USPC ........................................................ 709/206
See application file for complete search history.

(56) References Cited

U.S. PATENT DOCUMENTS 6,721,811 B1 *   4/2004   Ozaki et al. ....................... 710/5
6,823,368 B1    11/2004   Ullmann et al.
(Continued)

FOREIGN PATENT DOCUMENTS

CN              1705944 A       12/2005

OTHER PUBLICATIONS

International Search Report: mailed Sep. 8, 2011; PCT/CN2011/077061.

(Continued)

*Primary Examiner* — Ondrej Vostal
(74) *Attorney, Agent, or Firm* — Ladas & Parry LLP

(57) ABSTRACT

Embodiments of the present invention provide a method for presenting reposted messages. The method includes: respectively establishing, in a server for each piece of original message X, a reposting chain, which takes the each piece of original message X as a root node, generating a piece of reposted message each time the original message X is reposted, and adding the reposted message to the reposting chain as a sub-node; and pulling needed reposted messages from the server when a client terminal device, at which a user locates receives an instruction instructing viewing the reposted messages corresponding to the original message X in a full amount message aggregation mode, and displaying the reposted messages on a page. Embodiments of the present invention also provide a system for presenting reposted messages. With the scheme of the present invention, a whole reposting chain of the original message may be presented to the user.

14 Claims, 1 Drawing Sheet

(56) References Cited

U.S. PATENT DOCUMENTS

| | | | |
|---|---|---|---|
| 6,985,754 B1* | 1/2006 | Pedersen et al. | 455/556.2 |
| 7,251,782 B1* | 7/2007 | Albers et al. | 715/711 |
| 7,529,835 B1* | 5/2009 | Agronow et al. | 709/226 |
| 8,239,491 B1* | 8/2012 | Tsun | 709/219 |
| 8,448,227 B2* | 5/2013 | Eyal | 726/5 |
| 2001/0016845 A1* | 8/2001 | Tribbensee | 707/10 |
| 2002/0049857 A1* | 4/2002 | Farber et al. | 709/245 |
| 2003/0157928 A1* | 8/2003 | Phillips | 455/414 |
| 2003/0167310 A1 | 9/2003 | Moody et al. | |
| 2004/0098229 A1* | 5/2004 | Error et al. | 702/186 |
| 2005/0255837 A1* | 11/2005 | Kwon | 455/414.4 |
| 2007/0186157 A1* | 8/2007 | Walker et al. | 715/530 |
| 2007/0189708 A1* | 8/2007 | Lerman et al. | 386/52 |
| 2007/0201086 A1* | 8/2007 | Kim et al. | 358/1.15 |
| 2007/0255823 A1 | 11/2007 | Astley et al. | |
| 2008/0005103 A1* | 1/2008 | Ratcliffe et al. | 707/5 |
| 2008/0104128 A1* | 5/2008 | Drayer et al. | 707/200 |
| 2008/0195470 A1* | 8/2008 | Ferrer | 705/14 |
| 2009/0030774 A1* | 1/2009 | Rothschild et al. | 705/10 |
| 2009/0046650 A1* | 2/2009 | Dalsgaard et al. | 370/329 |
| 2009/0210391 A1* | 8/2009 | Hall et al. | 707/3 |
| 2009/0254601 A1* | 10/2009 | Moeller et al. | 709/201 |
| 2009/0287602 A1* | 11/2009 | Brunsmann | 705/40 |
| 2009/0303388 A1* | 12/2009 | Yamada et al. | 348/581 |
| 2010/0011425 A1* | 1/2010 | Eyal | 726/5 |
| 2010/0217811 A1* | 8/2010 | Kay | 709/206 |
| 2010/0259560 A1* | 10/2010 | Jakobson et al. | 345/629 |
| 2011/0004662 A1* | 1/2011 | Dodsworth | 709/206 |
| 2011/0043652 A1* | 2/2011 | King et al. | 348/222.1 |
| 2011/0320284 A1* | 12/2011 | Tennenholtz et al. | 705/14.69 |
| 2011/0320423 A1* | 12/2011 | Gemmell et al. | 707/706 |
| 2012/0042020 A1* | 2/2012 | Kolari et al. | 709/206 |
| 2012/0110032 A1* | 5/2012 | Robison et al. | 707/812 |
| 2012/0150972 A1* | 6/2012 | Morris et al. | 709/206 |
| 2012/0226521 A1* | 9/2012 | Bosworth et al. | 705/7.32 |
| 2013/0007141 A1* | 1/2013 | Chen et al. | 709/206 |
| 2013/0013700 A1* | 1/2013 | Sittig et al. | 709/206 |

OTHER PUBLICATIONS

Extended European Search Report; dated Jun. 3, 2013; Appln. No. 11819362.2-1862 /2549391 PCT/CN2011077061.

Australian Office Action dated Jul. 8, 2013; Appln. No. 2011295570.

* cited by examiner

METHOD AND SYSTEM FOR PRESENTING REPOSTED MESSAGE

This application claims the benefit of priority from Chinese Patent Application, No. 201010266925.2, entitled "Method and System for Presenting Reposted Message" and filed on Aug. 24, 2010, the entire contents of which are hereby incorporated by reference.

FIELD OF THE INVENTION

The present invention relates to Internet technologies, and more particularly, to a method and system for presenting reposted messages.

BACKGROUND OF THE INVENTION

Although still being at a starting stage, micro-blog products have already favored by most of users. The micro-blog products are not only used in usual entertainment, but also widely used in daily work

SUMMARY

In view of this, the present invention aims at provides a method for presenting reposted messages, by which a whole reposting chain of the original message may be presented to the user.

Another objective of the present invention is to provide a system for presenting reposted messages, by which a whole reposting chain of the original message may be presented to the user.

In order to achieve the above objectives, the technical scheme of the present invention is achieved as follows:

A method for presenting reposted messages includes:

respectively establishing, in a server for each piece of original message X, a reposting chain, which takes the each piece of original message X as a root node, generating a piece of reposted message each time the original message X is reposted, and adding the reposted message to the reposting chain as a sub-node; and pulling needed reposted messages from the server when a client terminal device, at which a user locates, receives an instruction instructing viewing the reposted messages corresponding to the original message X in a full amount message aggregation mode, and displaying the reposted messages on a page.

A system for presenting reposted messages includes a server and a client terminal device.

The server is configured to respectively create a reposting chain for each piece of original message X, which takes the each piece of original message X as a root node, generate a piece of reposted message each time the original message X is reposted, and add the reposted message to the reposting chain as a sub-node;

the client terminal device is configured to pull needed reposted messages from the server when receiving an instruction instructing viewing the reposted messages corresponding to the original message X in a full amount message aggregation mode, and display the reposted messages on a page.

A readable storage medium is configured to store computer program codes, for executing, when being executed by a computer unit, the above steps.

In view of the above, with the scheme of the present invention, the whole reposting chain of the original message may be presented to the user, which increases the information amount obtained by the user. In addition, the scheme of the present invention is simple, convenient and easy to popularize.

BRIEF DESCRIPTION OF DRAWINGS

To make the above and other features and merits of the present invention more apparent, the illustrative embodiments of the present invention are described hereafter in detail with reference to the accompanying drawings. The drawings include.

DETAILED DESCRIPTION OF THE INVENTION

At present, all the mainstream micro-blog products provide a message reposting function. For a piece of relative hot news, this news may be reposted hundreds of times. For each one who reposts the message, he/she only can see very little information, such as comments posted by a listener or an original message. However, a user may wish to see a whole reposting chain of the original message, i.e., ones who repost the original information and comments respectively made by the ones who repost the original information when reposting the original message. However, the conventional method can not satisfy this requirement of the user.

As for the problem in the conventional method, embodiments of the present invention provide a new scheme for presenting reposted messages, i.e. a full amount message aggregation mode, which may present a whole reposting chain of an original message to a user.

The scheme of the present invention is further described in detail hereinafter with reference to the accompanying drawings to make the technical solution of the present invention more clear and apparent.

Figure 1:
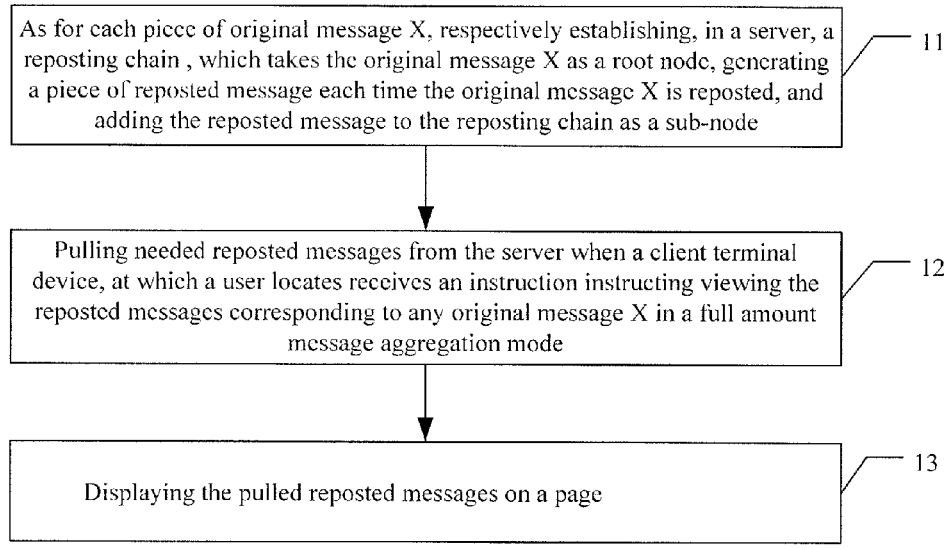
FIG. 1 is a flow chart illustrating a method in accordance with an embodiment of the present invention.

FIG. 1 is a flow chart illustrating a method in accordance with an embodiment of the present invention. As shown in FIG. 1, the following blocks are included.

Block 11: A reposting chain is established in a server for each original message X. The reposting chain takes the original message X as a root node. A piece of reposted message is generated each time the original message X is reposted, and is added to the reposting chain as a sub-node.

The reposting mentioned here refers to reproduction, quotation and reply, etc. Any contact behavior occurred between two messages belong to the scope of the reposting.

Block 12: A desired reposted message is pulled from the server when a client terminal device of the user receives an instruction instructing the user to view reposted messages corresponding to any original message X in a full amount aggregation mode.

In actual application, for each original message, a button indicating viewing reposted messages in the full amount message aggregation mode may be accordingly set. When the user clicks on this button, this block and subsequent processes are triggered.

Block 13: The pulled reposted messages are displayed on a page.

The original message X may be simultaneously displayed on the page. The original message X locates at the top of the page. Each of the reposted messages is displayed in a descending time order that the reposted messages are reposted.

Since a piece of hot message may be reposted for thousands of times, if all reposted messages are pulled at once, a great deal of load must be brought on the server. To this end, the scheme of the present invention provides a batch and multiple times pull strategy. Specifically, first, N pieces of reposted messages are pulled from the server, and are shown on the page. Then, when an instruction for turning the page is received, N pieces of reposted messages are pulled from the server once again, and shown on the page, and so on. In this way, if the user exists after only viewing the first or the first few pages, the subsequent reposted messages need not to be pulled, by which the load of the server is reduced.

N is a positive integer, the specific value of which may be determined according to actual needs. For instance, taking into account of limitation of the number of bytes which are exchanged between the client terminal device and the server each time and average length of each piece of reposted message. The value of N may be set as 15. Preferably, after the reposted messages are continuously pulled M times, the page will not be permitted to be turned over. Instead, the user is prompted to jump to a designated web page, and the reposted messages which are not pulled may be displayed to the user through the designated web page. The user may complete the jumping by manually clicking on the designated web page. Similarly, M is a positive integer, the specific value of which may be determined according to actual needs. For instance, M is 8.

The server saves each piece of original message and all reposted messages corresponding to the each piece of original message, and all the reposted messages are sorted in a descending time order that the reposted messages are reposted. That is, the closer of the time between the time that the reposted message is reposted and the current time, the more front the reposted message. Each time the client terminal device sends a pulling request to the server, the ID (it is a conventional method for obtaining the ID) of the original message is carried. The server finds the original message and all the reposted messages corresponding to the original message according to the ID, and return N pieces of reposted messages to the client terminal device each time.

In block 13, as for N pieces of reposted messages which are pulled each time, N controls need to be created first. Then, the N controls are respectively initialized with the pulled N pieces of reposted messages, and the N pieces of controls are displayed with the initialized N controls. The specific method for creating and displaying the controls is the conventional method, and is not repeated here. The N controls have the similar forms, and have great reusability. Each control is implemented with a self-drawn mode. Each control computes size and location of each internal area inside the each control. That is, each control is responsible for its internal relevant processing, and follows the principle of unity. For instance, each reposted message occupies a same page when being displayed at last. And, each area in the page, for instance, a user picture, nickname or reposted time, etc., occupies the same size and locates at the same position. For instance, the reposted time is always displayed on the upper right corner. Preferably, in actual application, in order to reduce screen flashing and performance consumption due to the page refresh, the re-arrangement of the page may be minimized under the premise of satisfying the requirements of the user. For instance, when the user adjusting the size of the page by dragging the window, the re-arrangement of the page is not triggered at each time point that the user drags the mouse, but is triggered at the moment that the user stops dragging the mouse.

In addition, memory occupancy is an important index for measuring performances of the desktop application program. Along with the increase of the pulled messages, the increase of the memory is inevitable. If some strategies may be adopted to reduce the consumption of the memory, it is undoubtedly helpful for the enhancement of the system performances. The scheme of the present invention may adopt the following strategies.

First: Message Pool

A message pool is maintained on a client terminal device, and is used for not repeatedly storing all messages which are pulled by the client terminal device from the server. Each message consists of two components, i.e. a message ID and a message body. The messages mentioned here are not limited to the reposted messages. Since a user may open many pages, which are not limited to the pages for displaying the reposted messages. Accordingly, the client terminal device may need to pull various messages from the server.

Each time the client terminal device pulls N pieces of reposted messages from the server, the client terminal device pulls the message IDs of the N pieces of reposted messages from the server first. And then, the client terminal device determines whether the message ID of each of the pulled reposted messages is in the message pool. If the message ID of each of the pulled reposted messages is in the message pool, the message body corresponding to the message ID is obtained from the message pool (This shows that each of the reposted messages has been pulled before, and there is no need to repeatedly pull the reposted messages); otherwise, the message body corresponding to the message ID is pulled from the server to form N pieces of reposted messages. Apparently, if the message ID of a reposted message is not in the message pool, it needs to add the message ID into the message pool after pulling the reposted message.

Preferably, when the number of the reposted messages in the message pool reaches a predetermined upper limit, partial reposted messages may be eliminated according to a predetermined method. For instance, a reference counting may be maintained for each piece of message. If a page shows this reposted message, one is added to the corresponding reference counting. Otherwise, when the page, on which the message is displayed, is destructed, the reference counting corresponding to the message is decremented by one. When the reference counting is one (It shows that no page displays this reposted message), this reposted message is eliminated.

Second: Container Pool

A container pool is maintained on a client terminal device. When a fallback instruction as for any page is received, the page is destructed, and controls corresponding to the page are added to the container pool.

Each time N pieces of reposted messages are pulled from the server, it is determined first whether there are available controls (i.e., the controls for displaying the reposted messages) in the container pool. If there is no available control in the container pool, N controls are created, the N controls are respectively initialized with the N pieces of pulled reposted messages, and the N pieces of reposted messages are displayed with the initialized N controls. If there are available controls in the container pool, it is further determined whether the number of the available controls is larger than or equal to N. If yes, the N controls are respectively initialized with the pulled N pieces of reposted messages, and the N pieces of reposted messages are displayed with the N initialized available controls. If no, partial controls are created, and N controls are obtained by adding the available controls to the newly created controls. The N controls are respectively initialized with the pulled N pieces of reposted messages, and the N pieces of reposted messages are displayed with the initialized N controls.

Till then, the description on the embodiments of the method of the present invention is finished.

Figure 2:
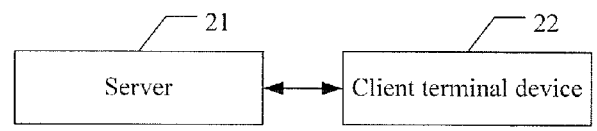
FIG. 2 is a schematic diagram illustrating structure of a system in accordance with an embodiment of the present invention.

On the basis of the above method, FIG. 2 is a schematic diagram illustrating structure of a system in accordance with an embodiment of the present invention. As shown in FIG. 2, the system includes a server 21 and a client terminal device 22.

The server 21 is configured to respectively establish a reposting chain for each piece of original message X. The reposting chain takes the original message X as the root node. Each time the original message X is reposted, a piece of reposted message is generated, and is added to the reposting chain as a sub-node.

The client terminal device 22 is configured to pull needed reposted messages from the server 21 when receiving an instruction for viewing the reposted messages corresponding to the original message X with a full amount message aggregation mode, and display the reposted messages on a page.

Preferably, the original message X is simultaneously displayed on the page. The original message X locates at the top of the page, and each of the reposted messages is displayed in a descending time order that the reposted messages are reposted.

Figure 3:
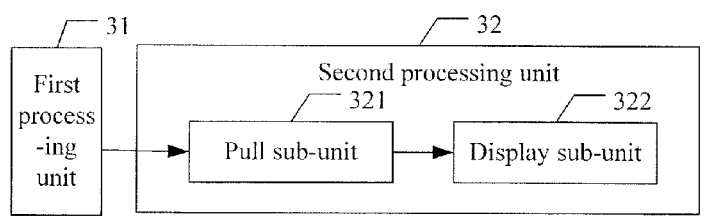
FIG. 3 is a schematic diagram illustrating structure of a client terminal device 22 shown in FIG. 2.

FIG. 3 is a schematic diagram illustrating structure of the client terminal device 22 shown in FIG. 2. As shown in FIG. 3, the client terminal device 22 includes a first processing unit 31 and a second processing unit 32.

The first processing unit 31 is configured to send a notification to the second processing unit 32 to inform the second processing unit 32 to execute its function when receiving the instruction for viewing the reposted messages corresponding to any original message X with the full amount message aggregation mode.

The second processing unit 32 is configured to pull the needed reposted messages from the server 21 after receiving the notification sent from the first processing unit 31, and display the reposted messages on the page. The original message X is simultaneously displayed on the page. The original message X locates at the top of the page, and each of the reposted messages is displayed in a descending time order that the reposted messages are reposted.

The second processing unit 32 may specifically include a pull sub-unit 321 and a display sub-unit 322.

The pull sub-unit 321 is configured to pull N pieces of reposted message from the server 21 after receiving the notification sent from the first processing unit 31. N is a positive integer. N pieces of reposted messages are pulled again each time the instruction for turning a page is received.

The display sub-unit 322 is configured to display the N pieces of reposted messages which are pulled each time on a page.

The above pull sub-unit 321 is further configured to maintain a message pool which is used for not repeatedly storing all the reposted messages which are pulled by the client terminal device from the server 21. Each piece of reposted message consists of the message ID and a message body.

When N pieces of reposted messages need to be pulled from the server 21, the message IDs of the N pieces of reposted messages are pulled from the server 21 first. And then, as for the message ID of each of the pulled reposted messages, it is determined whether the message ID is in the message pool. If yes, the message body corresponding to the message ID is pulled from the message pool; otherwise, the message body corresponding to the message ID is pulled from the server 21 to form N pieces of reposted messages.

When the number of the reposted messages in the message pool reaches a predetermined upper limit, the method for eliminating partial messages according to a predetermined method includes: as for any reposted message, if there is no page for displaying the reposted message when the number of the reposted messages in the message pool reaches the predetermined upper limit, the reposted message is eliminated.

As for the N pieces of reposted messages pulled each time, the display sub-unit 322 first needs to create N controls, and initialize the N controls with the N pieces of reposted messages, and display the N pieces of reposted messages with the initialized N controls.

Alternatively, the display sub-unit 322 maintains a container pool. When a fallback instruction as for any page is received, the page is destructed, and controls corresponding to the page are added to the container pool. As for the N pieces of reposted messages pulled each time, it is determined first whether there are available controls in the container pool. If there is no available control in the container pool, N controls are created, the N controls are respectively initialized with the N pieces of pulled reposted messages, and the N pieces of reposted messages are displayed with the N initialized controls. If there are available controls in the container pool, it is further determined whether the number of the available controls is larger than or equal to N. If yes, the N controls are respectively initialized with the N pieces of pulled reposted messages, and the N pieces of reposted messages are displayed with the N initialized available controls. If no, partial controls are established, and N controls are obtained by adding the available controls to the newly created controls. The N controls are respectively initialized with the pulled N pieces of reposted messages, and the N pieces of reposted messages are displayed with the initialized N controls.

Refer to the corresponding description of the method embodiments shown in FIG. 1 for the specific work flow of the embodiments shown in FIGS. 2 and 3, which is not repeated here.

The foregoing description only describes preferred embodiments of the present invention and is not used for limiting the protection scope thereof. Any modification, equivalent substitution, or improvement made without departing from the spirit and principle of the present invention should be covered by the protection scope of the present invention.

The invention claimed is:

1. A method for presenting reposted messages, comprising:
respectively establishing, in a server for each piece of original message X, a reposting chain, which takes the each piece of original message X as a root node, generating a piece of reposted message each time the original message X is reposted, and adding the reposted message to the reposting chain as a sub-node; and
pulling needed reposted messages from the server when a client terminal device, at which a user locates, receives an instruction instructing viewing the reposted messages corresponding to the original message X in a full amount message aggregation mode, and displaying the reposted messages on a page;
wherein the method further comprises: simultaneously displaying the original message X on the page, which locates at top of the page; and displaying each of the reposted messages in a descending time order that the reposted messages are reposted;

wherein pulling the needed reposted messages from the server and displaying the reposted messages on the page comprises: step Y: pulling N pieces of reposted messages from the server, and displaying the N pieces of reposted messages on the page; and repeating the step Y each time an instruction for turning a page is received; wherein N is a positive integer;

wherein the client terminal device maintains a container pool, and the method further comprises:

destructing, when receiving a fallback instruction as for any page, the page, and adding controls corresponding to the page to the container pool; wherein pulling the N pieces of reposted messages from the server and displaying the N pieces of reposted messages on the page comprises:

determining whether there are available controls in the container pool, creating N controls, initializing the N controls with the pulled N pieces of reposted messages, and displaying the N pieces of reposted messages with the initialized N controls if there is no available control in the container pool; determining whether number of the available controls is larger than or equal to N if there are available controls in the container pool, initializing the N available controls with the pulled N pieces of reposted messages, and displaying the N pieces of reposted messages with the initialized N available controls if the number of the available controls is larger than or equal to N; creating partial controls, obtaining the N controls by adding the partial controls to the available controls, initializing the N controls with the pulled N pieces of reposted messages and displaying the N pieces of reposted messages with the initialized N controls if the number of the available controls is smaller than N.

2. The method according to claim 1, further comprising:
prompting the user to jump to a designated web page after continuously pulling the N piece of reposted message M times; and
displaying reposted messages which are not pulled on the designated web page; wherein M is a positive integer.

3. The method according to claim 2, wherein N is 15 and M is 8.

4. The method according to claim 1, wherein a message pool is maintained at the client terminal device for not repeatedly storing all the reposted messages pulled by the client terminal device from the server; wherein each of the reposted messages consists of a message ID and a message body; wherein pulling the N pieces of reposted messages from the server comprises:

pulling message IDs of the N pieces of reposted messages from the server;

determining whether a message ID of each piece of the pulled reposted messages is in the message pool, obtaining a message body corresponding to the message ID from the message pool if the message ID of each piece of the pulled reposted messages is in the message pool; otherwise, pulling the message body corresponding to the message ID of each piece of the pulled reposted messages from the server to form N pieces of reposted messages.

5. The method according to claim 4, further comprising:
eliminating partial reposted messages according to a predetermined mode when number of reposted messages in the message pool reaches a predetermined upper limit.

6. The method according to claim 5, wherein eliminating the partial reposted messages according to the predetermined mode comprises:

eliminating any reposted message if the number of the reposted messages in the message pool reaches the predetermined upper limit and there is no page for displaying this reposted message.

7. The method according to claim 1, wherein pulling the N pieces of reposted messages from the server and displaying the N pieces of reposted messages on the page comprises:
creating N controls;
initializing the N controls with the pulled N pieces of reposted messages; and
displaying the N pieces of reposted messages with the initialized N controls.

8. A non-transitory readable storage medium storing a computer program, executed by a computer to perform steps in claim 1.

9. A system for presenting reposted messages, comprising: a server and a client terminal device; wherein the server is configured to respectively create a reposting chain for each piece of original message X, which takes the each piece of original message X as a root node, generate a piece of reposted message each time the original message X is reposted, and add the reposted message to the reposting chain as a sub-node;

the client terminal device is configured to pull needed reposted messages from the server when receiving an instruction instructing viewing the reposted messages corresponding to the original message X in a full amount message aggregation mode, and display the reposted messages on a page; wherein the client terminal device is further configured to simultaneously display the original message X on the page, which locates at top of the page; and display each of the reposted messages in a descending time order that the reposted messages are reposted; and wherein the client terminal device is further configured to comprise: a pull sub-unit, to pull N, which is a positive integer, pieces of reposted messages from the server and pull N pieces of reposted messages again each time an instruction for turning a page is received; and a display sub-unit, to display the N pieces of reposted messages which are pulled each time on the page; wherein;

the display sub-unit is further configured to create N controls for the N pieces of reposted messages which are pulled each time, initialize the N controls with the N pieces of reposted messages, and display the N pieces of reposted messages with the initialized N controls; or the display sub-unit is further configured to maintain a container pool, destruct, when receiving a fallback instruction as for any page, the page, add controls corresponding to the page to the container pool, determine whether there are available controls in the container pool as for the N pieces of reposted message which are pulled each time, create the N controls, initialize the N controls with the pulled N pieces of reposted messages, and display the N pieces of reposted messages with the initialized N controls if there is no available control in the container pool; and is further configured to determine whether number of the available controls is larger than or equal to N if there are available controls in the container pool, initialize the N available controls with the pulled N pieces of reposted messages, and display the N pieces of reposted messages with the initialized N available controls if the number of the available controls is larger than or equal to N, and create partial controls, obtain the N controls by adding the partial controls to the available controls, initialize the N controls with the pulled N pieces of reposted messages, and display the N pieces of reposted messages with the initialized N controls if the number of the available controls is smaller than N.

10. The system according to claim 9, wherein the client terminal device comprises: a first processing unit and a second processing unit; wherein the first processing unit is configured to send a notification to the second processing unit to inform the second processing unit to execute its function when receiving the instruction for viewing the reposted messages corresponding to any original message X with the full amount message aggregation mode; and the second processing unit is configured to pull the needed reposted messages from the server after receiving the notification sent from the first processing unit, and display the reposted messages on the page; wherein the original message X is simultaneously displayed on the page, the original message X locates at the top of the page and each of the reposted messages is displayed in subsequent in a descending time order that the reposted messages are reposted.

11. The system according to claim 10, wherein the pull sub-unit is further configured to maintain a message pool, which is used for not repeatedly storing all messages which are pulled by the client terminal device from the server, and each of which consists of a message ID and a message body; and further configured to pull message IDs of the N pieces of reposted messages when the N pieces of reposted messages need to be pulled from the server, respectively determine whether a message ID of each piece of the reposted messages is in the message pool, obtain a message body corresponding to the message ID from the message pool if the message ID of each piece of the reposted messages is in the message pool, and pull the message body corresponding to the message ID from the server to form the N pieces of reposted messages if the message ID of each piece of the reposted message is not in the message pool.

12. The system according to claim 11, wherein further configured to eliminate any reposted message if the number of reposted messages in the message pool reaches a pre-determined upper limit and there is no page for displaying the reposted message.

13. The system according to claim 11, wherein the display sub-unit is further configured to create N controls for the N pieces of reposted messages which are pulled each time, initialize the N controls with the N pieces of reposted messages, and display the N pieces of reposted messages with the initialized N controls.

14. A method for presenting reposted messages, comprising:

respectively establishing, in a server for each piece of original message X, a reposting chain, which takes the each piece of original message X as a root node, generating a piece of reposted message each time the original message X is reposted, and adding the reposted message to the reposting chain as a sub-node; and pulling needed reposted messages from the server when a client terminal device, at which a user locates, receives an instruction instructing viewing the reposted messages corresponding to the original message X in a full amount message aggregation mode, and displaying the reposted messages on a page;

wherein the reposting chain is a Social Networking Services (SNS) reposting chain.

* * * * *